United States Patent Office 3,143,639
Patented Aug. 4, 1964

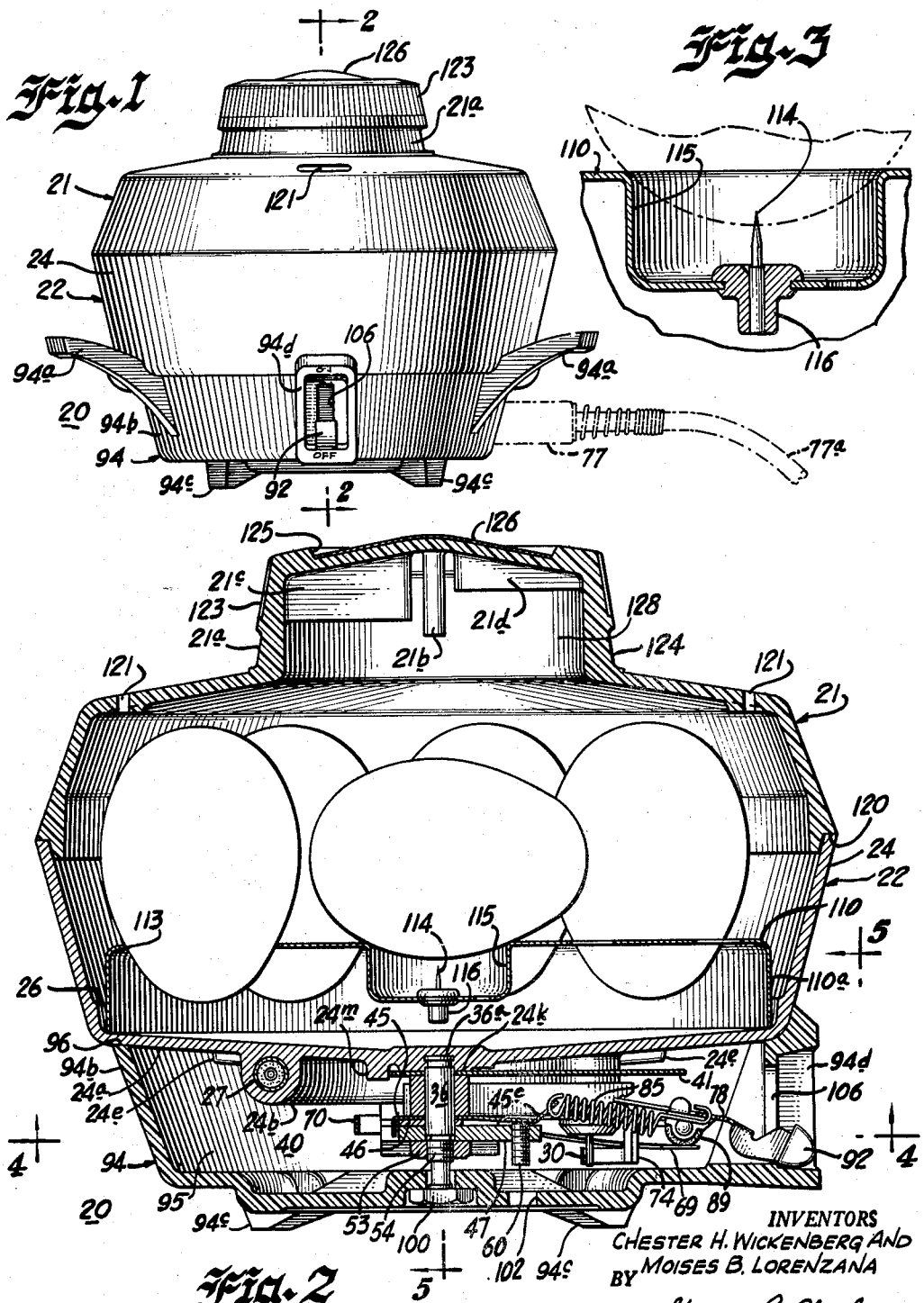

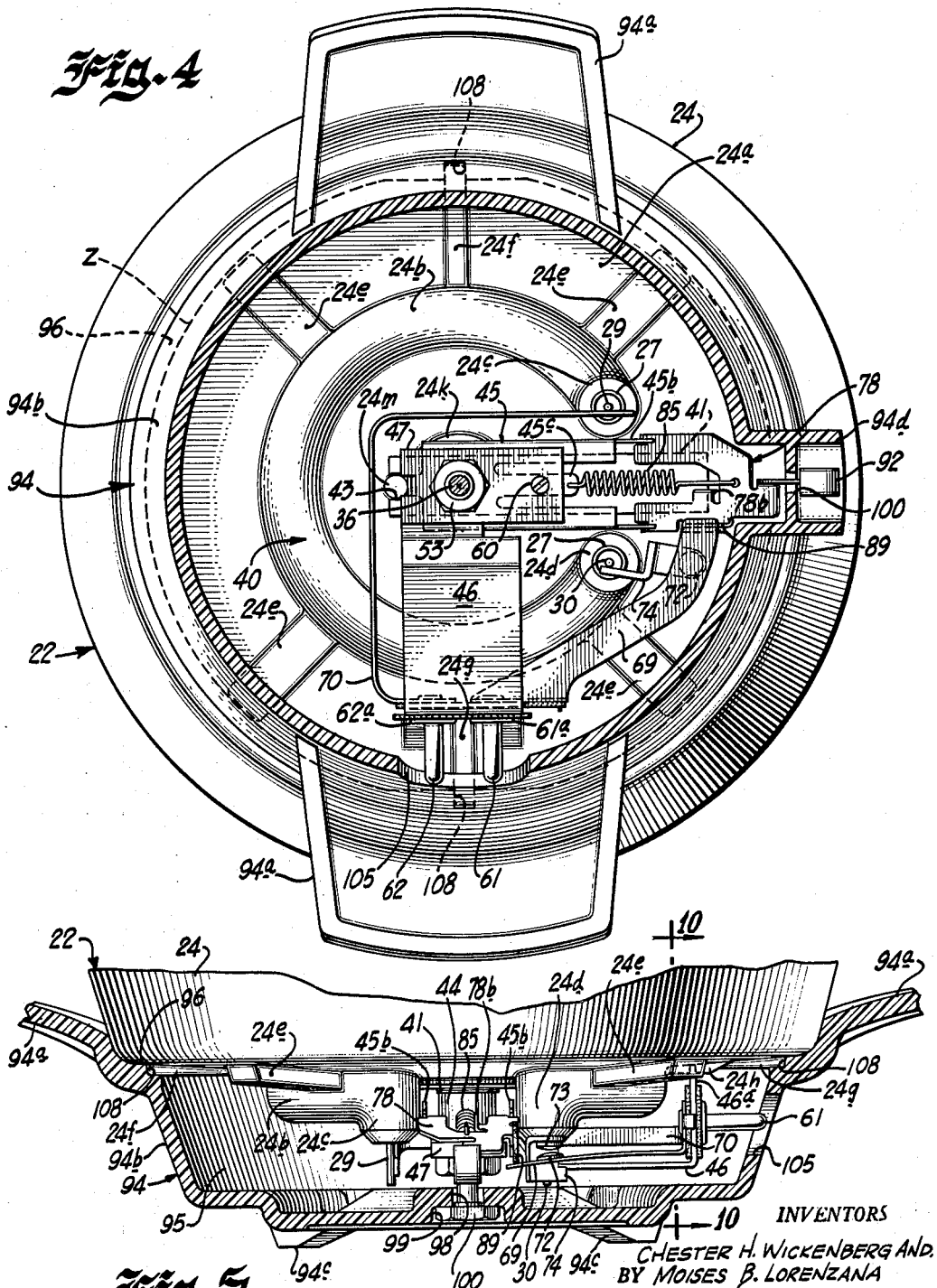

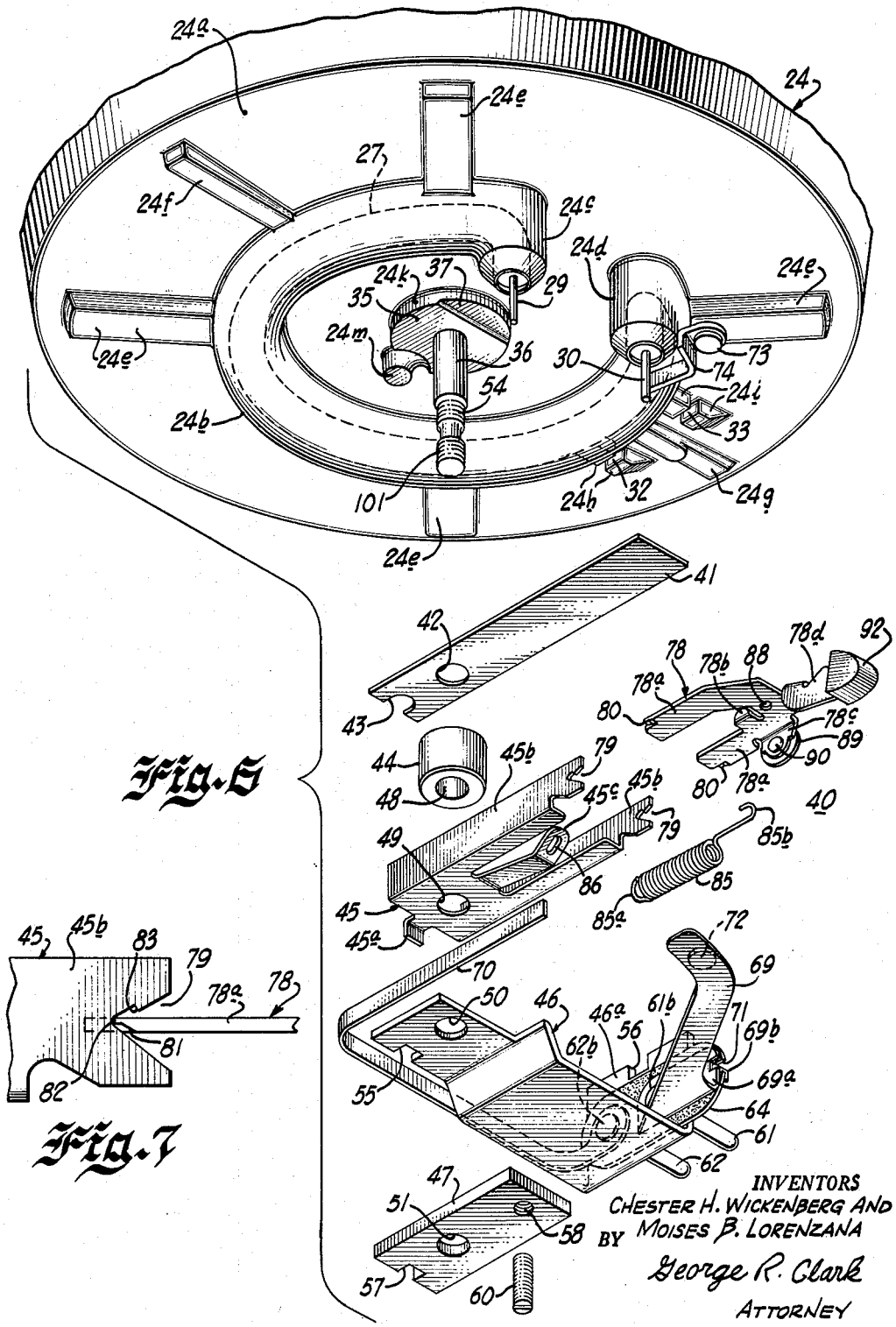

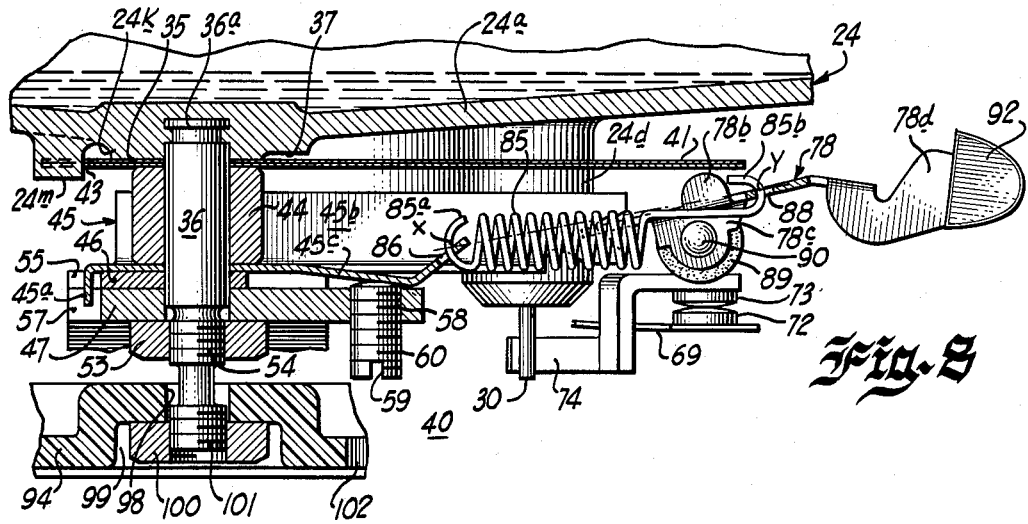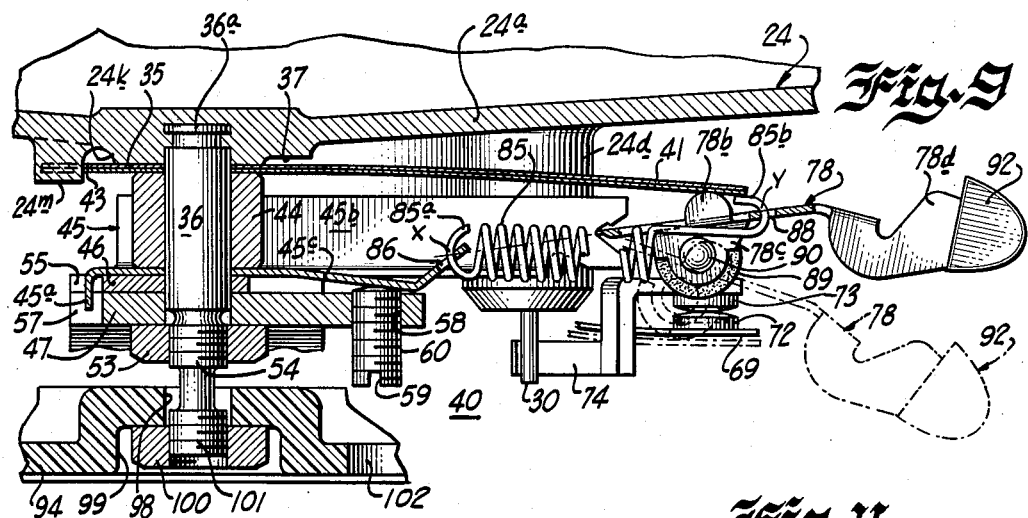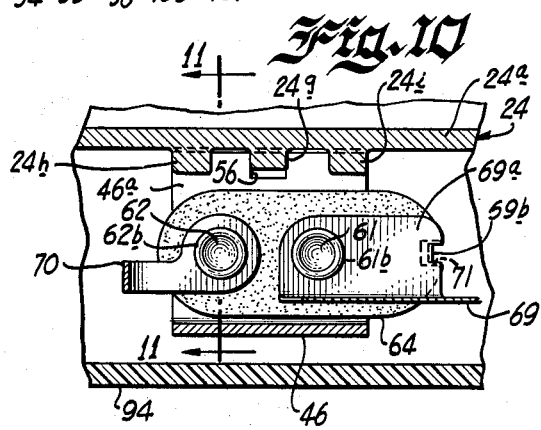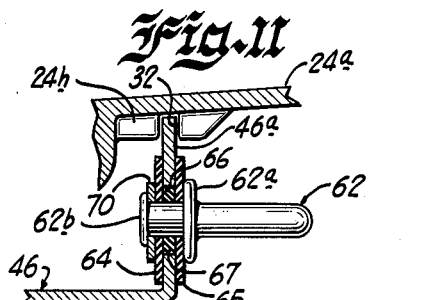

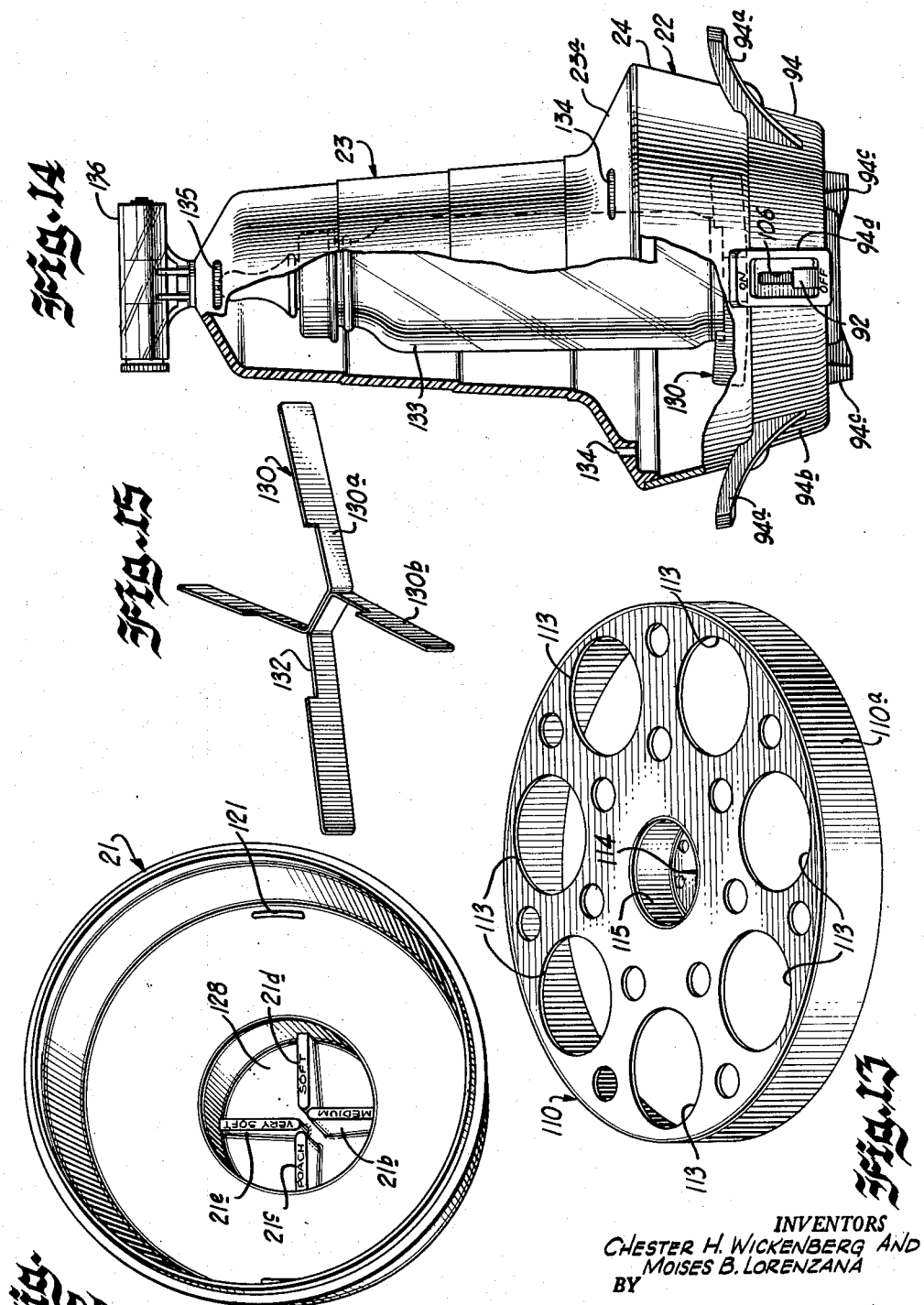

3,143,639
AUTOMATIC HEATING DEVICE
Chester H. Wickenberg, Elgin, and Moises B. Lorenzana, Glen Ellyn, Ill., assignors to Sunbeam Corporation, Chicago, Ill., a corporation of Illinois
Filed May 22, 1961, Ser. No. 111,809
10 Claims. (Cl. 219—442)

The present invention relates to an automatic heating device and more specifically to an automatic heating device for heating or in many cases cooking certain materials to a desired temperature or a desired degree. More specifically, the present invention is an improvement on the heating devices disclosed and claimed in Jepson Patents 2,761,375 and 2,778,921, both assigned to the same assignee as the present application.

The aforesaid Jepson patents disclose heating devices commonly termed an egg cooker and a baby bottle warmer which have been extensively sold on the market for quite a number of years. In fact, these devices can be purchased in any city in the United States. Essentially these heating devices comprise a suitable vessel having associated therewith an electric heating element and a thermal responsive device for automatically terminating the heating or cooking operation when predetermined conditions have been obtained. Although these patented heating or cooking devices have been very successful, it would be desirable to provide an improved device retaining all the advantages set forth in the prior patents but wherein the heating portion of the same device may be used interchangeably as an egg cooker or a baby bottle warmer. It would be desirable to provide an improved temperature responsive device for automatically controlling the heating, which device is less expensive to manufacture and, yet, which is equally as foolproof in operation as the arrangements disclosed and claimed in the aforesaid Jepson patents.

Accordingly, it is an object of the present invention to provide a new and improved heating device.

It is another object of the present invention to provide an improved egg cooker, a major portion of which may be used to convert the device to a baby bottle warmer.

Still another object of the present invention resides in the provision of an automatic heating device with improved thermal responsive means for terminating the heating when predetermined conditions occur.

It is another object of the present invention to provide an automatic heating device of improved construction in which the heating is terminated dependent upon the time necessary to evaporate variable quantities of water or similar liquid.

Still another object of the present invention resides in the provision of an improved heating device either in the form of an egg cooker or baby bottle warmer of simple and compact construction requiring a minimum of parts and manufacturing expense and, yet, capable of giving many years of foolproof operation.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is an elevational view of the improved heating device of the present invention when used as an egg cooker with the temperature responsive control in the "off" position;

FIG. 2 is an enlarged sectional view taken on line 2—2 of FIG. 1;

FIG. 3 is an enlarged fragmentary view of a portion of FIG. 2 to show the piercing mechanism for piercing the egg shell prior to cooking thereof;

FIG. 4 is a sectional view taken on line 4—4 of FIG. 2 assuming that FIG. 2 shows the complete structure;

FIG. 5 is a sectional view taken on line 5—5 of FIG. 2 and again assuming that FIG. 2 shows the complete structure;

FIG. 6 is an exploded perspective view of the temperature responsive means of the present invention, also showing the bottom of the cooking vessel with which this temperature responsive means is associated;

FIG. 7 is a greatly enlarged view of a portion of the thermal or temperature responsive means or device of the present invention;

FIG. 8 is an enlarged fragmentary sectional view of a portion of FIG. 2, but showing the thermal responsive device in the "on" position but with the temperature sensitive portion of the thermal responsive device in the unheated condition;

FIG. 9 is a view similar to FIG. 8 showing in solid lines the thermal responsive device at the instant before causing the sheating operation to be terminated, and showing in dotted lines the same condition shown in FIG. 2;

FIG. 10 is an enlarged sectional view taken on line 10—10 of FIG. 5 assuming that FIG. 5 shows the complete structure;

FIG. 11 is a fragmentary sectional view taken on line 11—11 of FIG. 10, also assuming that FIG. 10 shows the complete structure;

FIG. 12 is a perspective view showing the interior of the cover of the egg cooker of the present invention;

FIG. 13 is a perspective view of the egg rack employed with the egg cooker of the present invention;

FIG. 14 is an elevational view with certain portions cut away of the heating device of the present invention utilized as a baby bottle warmer; and FIG. 15 is a perspective view of a bottle supporting means used when the heating device of the present invention is utilized as a baby bottle warmer.

Briefly, the present invention comprises a heating device employing a receptacle having an inclined bottom with electrical heating means associated therewith, and means for supporting eggs, in the event that the device is used as an egg cooker, or a baby's bottle, in the event that the device is used as a baby bottle warmer. The egg support includes means for piercing the shell of each egg at the place adjacent the air pocket to prevent cracking or rupture of the shell during the cooking operation. The cover of the device, whether it be used as a baby bottle warmer or as an egg cooker, includes means for measuring the proper amount of water to be inserted into the vessel depending upon the end conditions desired, and when this water has all evaporated a bimetallic element forming a part of the thermal responsive means and responsive to the temperature of the bottom of the receptacle at the lowest level thereof cuts off the electric current supplied to the heating means. As long as any water is disposed in the vessel overlying the portion thereof to which the bimetallic element is responsive, the temperature will, of course, be limited to approximately the boiling temperature of water. Upon evaporation of all the water, the temperature rises rapidly to effect operation of the thermal or temperature responsive control device. As in one of the prior Jepson patents referred to above, an egg poaching tray may be used if it is desired to poach the eggs instead of boiling them. Whether the device is used to warm a baby's bottle, to boil eggs or to poach eggs, the same process of automatic heating is employed. An improved temperature responsive device is employed in which with a minimum of elements and a minimum of fastening means a very satisfactory, foolproof device is provided.

Referring now to the drawings, there is illustrated in FIG. 1 to 13 of the drawings a heating device specifically in the form of an egg cooker, a major portion of which, however, may be employed as a baby bottle warmer as clearly shown in FIGS. 14 and 15 of the drawings. The heating device in FIGS. 1 to 11 of the drawings is generally designated by the reference numeral 20. The heating device 20 comprises a cover 21 and a lower heating vessel and base assembly generally designated by the reference numeral 22, which element 22 is identical whether used as a baby bottle warmer or as an egg cooker and, consequently, in FIG. 14 of the drawings is also designated by the reference numeral 22. When the device is used as a baby bottle warmer, as illustrated in FIG. 14 of the drawings, then instead of the cover 21 shown in FIGS. 1 and 2, a cover 23, described in greater detail hereinafter and in many respects quite similar to the corresponding cover of Jepson Patent No. 2,778,921, is employed. The covers 21 and 23 are each adapted to cooperate with the identical vessel and base assembly 22, and by associating the proper cover 21 or 23 therewith, the device becomes as egg cooker or a baby bottle warmer, respectively.

The vessel and base assembly 22 essentially comprises a temperature controlled electric heating device and is described in detail hereinafter prior to considering its use either as an egg cooker or as a baby bottle warmer. As clearly shown in the drawings, the vessel and base assembly 22 preferably comprises a vessel portion 24 formed as an aluminum die casting or the like in the shape of a relatively shallow, tapered wall, circular, open top container having a bottom 24a integrally formed with the somewhat tapered side walls. The bottom 24a is indicated as having a uniform slope toward the center so that the lowest level of the bottom 24a is essentially at the center of the bottom 24a. It will be appreciated that to utilize any cooking device to produce hard boiled eggs that it is necessary to cook them a relatively long time and, if desired, the vessel 22 may be provided with a suitable indicating means to indicate the depth of water necessary to be evaporated in the vessel 24 to produce hard boiled eggs. In a device built in accordance with the present invention, an annular ledge 26, clearly shown in FIG. 2 of the drawings, was provided for this purpose. If desired, the interior of the vessel 24 may be embossed with suitable indicia indicating that for hard boiled eggs the vessel should be filled to the level of the circular ledge 26.

For the purpose of supplying the necessary heat to cook any eggs supported in the vessel assembly 22 or to heat a baby's bottle in the event that it is so used, there is provided a suitable electrical heating element generally designated at 27 (FIGS. 2 and 6 of the drawings). The heating element 27 is preferably one of the well known sheathed type which conventionally comprises an outer metal sheath within which is disposed a suitable length of resistance wire such, for example, as Nichrome wire coiled in the form of a helix. Surrounding this coiled resistance wire within the sheath is a generally refractory composition commonly formed of fused magnesium oxide which centers the resistance element and which, furthermore, is a good heat conductor and, yet, a good electrical insulator. Preferably the sheathed heating element 27 is bent into the form of a substantially one-turn ring which is sometimes referred to as a C configuration and, as illustrated in the drawings, this C-shaped heating element is cast within a raised rib 24b integrally formed with the vessel 24 and the bottom 24a thereof, thus assuring that the heating element 27 is in intimate heat exchange relationship with the vessel 24. Preferably the ends of the sheathed heating element 27 are bent downwardly and are disposed within corresponding downwardly extending portions 24c and 24d of the rib 24b which, in effect, define sort of spaced lugs integral with the bottom of the vessel 24. Suitable rigid electrical terminals 29 and 30 project from the ends of the sheathed heating element 27 exposed at the ends of the lugs 24c and 24d. These terminals 29 and 30, as is well understood by those skilled in the art, are connected to the resistance element embedded in the material disposed within the sheath of the heating element 27.

For purposes which will become apparent as the following description proceeds, the underside of the vessel 24 is provided with a plurality of identical lugs 24e uniformly spaced from one another around the bottom and integrally formed with the bottom 24a during the casting operation of the vessel 24. Additionally, a pair of diametrically opposed lugs 24f and 24g are provided as well as lugs 24h and 24i, one located on either side of the lug 24g, each of the lugs 24h and 24i having a discontinuity therein so as to define notches 32 and 33 therein. All of these lugs are, of course, cast integrally with the vessel 24.

For the purpose of providing a good heat transmitting member from the vessel 24 to a suitable temperature responsive device, the vessel 24 is provided with a central depending lug 24k, best shown in FIGS. 6 and 8 of the drawings, which preferably has a machined surface 35 to make good contact with a suitable bimetallic element described hereinafter. Moreover, in order to permit assembly of the various elements comprising the vessel 24, there is provided a stud 36 projecting downwardly from the bottom 24a of the vessel 24 and having a portion 36a providing interlocking means thereon so that it may be cast into the bottom of vessel 24. As illustrated, the stud 36 is concentric with the heat transmitting lug 24k. For a purpose which will become apparent from the ensuing description, an additional lug 24m is provided adjacent the lug 24k. Moreover, the lug 24k has a portion thereof cut away as indicated at 37 (FIGS. 6, 8 and 9) thereby not to interfere with movement of a temperature sensitive or bimetallic element described hereinafter.

In accordance with the present invention there is provided a thermal or temperature responsive device generally designated by the reference numeral 40 which comprises a temperature responsive switch mechanism and associated electrical circuit relating the same to the heating element 27. This mechanism is secured to the vessel 24 in a very simple manner. The temperature responsive device 40 is shown in exploded view in FIG. 6 of the drawing where the individual elements thereof are clearly depicted. It will become apparent from the ensuing description that the stud 36 provides a fastening means for securing the entire thermal responsive device and electrical means in position in cooperation with various lugs and the like already described. An essential element of the thermal or temperature responsive device 40 comprises a bimetallic element of thermostat blade 41 of the cantilever type which is provided with an opening 42 at the fixed end thereof to receive the stud 36. It is furthermore provided at the fixed end with a notch 43 for receiving the lug 24m. The machined surface 35 of the lug 24k then provides intimate contact with a substantial portion of the bimetallic element 41 to insure that such element is directly responsive to the temperature of the bottom 24a of the vessel 24. It will be apparent that the notch or cut away portion 37 is provided so as not to interfere with the deflection of the bimetallic element. Actually the high expansion side of the bimetallic element 41 is in contact with the machined surface 35 of lug 24k so that the bimetallic element 41 tends to deflect away from the bottom 24a of the vessel 24 upon heating thereof.

The temperature responsive device 40 in addition to the bimetallic element 41 includes a bracket spacer 44, a pivot bracket 45, a terminal bracket 46 and an adjusting screw bracket 47, each of which is provided with an opening for receiving the stud 36. Thus, the bracket spacer 44 is provided with a central opening 48, the pivot bracket 45 is provided with an opening 49, the terminal bracket 46 is provided with an opening 50 and the adjusting screw bracket 47 is provided with an opening 51. These elements are assembled on the stud 36 in stacked relationship with the above identified openings in alignment. Thus, the bimetallic element 41 is disposed against the bottom of the vessel 24, with the successive elements comprising the bracket spacer 44, the pivot bracket 45, the terminal bracket 46 and the adjusting screw bracket 51 following in that order in stacked relationship. All of these elements are held in this stacked relationship, effectively clamped together, by a nut 53 engaging a first threaded portion 54 of stud 36.

Considering now these elements in more detail, the bracket spacer 44 is merely a cylindrical member to give a desired spacing. The pivot bracket 45 is a channel shaped member which extends between the spaced lugs 24c and 24d of the raised rib 24b containing the heating element 27 and substantially fills the space between these lugs, thus determining the positioning thereof. The pivot bracket 45 includes a depending ear 45a, a pair of spaced pivot arms 45b and a central deflectable spring retaining tab or finger 45c, all clearly depicted in FIG. 6 of the drawings. The flanges of the channel shaped pivot bracket 45 project toward the bottom 24a of the vessel 24 and substantially enclose the bracket spacer 44 as is clearly shown in FIGS. 8 and 9 of the drawings. The terminal bracket 46 includes a notch 55 for receiving the ear 45a of the pivot bracket 45 and, thus, orientating the pivot bracket and the terminal bracket with respect to each other at an angle of ninety degrees. The terminal bracket 46 includes at the end thereof remote from the opening 50 and notch 55 a flange 46a extending toward the bottom 24a of the vessel 24, the end thereof adjacent the vessel bottom 24a including a notch 56. Moreover, the end of the flange 46a is receivable within the notches 32 and 33 in the lugs 24h and 24i formed integrally with the bottom. Moreover, the lug 24g is receivable within the notch 56. It will be appreciated that with this arrangement the stud 36 and nut 53 clamp the terminal bracket 46 to the bottom of the vessel, and the notches 32, 33 and 56 prevent this bracket from rotational movement relative to the axis of the stud 36 and, furthermore, provide a rigid support for the flange 46a. The interlocking of the ear 45a of the pivot bracket 45 with the notch 55 further fixes the pivot bracket 45 relative to the terminal bracket 46. The adjusting screw bracket 47 is a rigid member having a notch 57 at one end thereof for also receiving the ear 45a and, hence, fixing the adjusting screw bracket 47 relative to the vessel 24. The adjusting screw bracket 47 includes a tapped opening 58 for receiving an adjusting screw 60 which is adapted to engage the spring supporting finger or tab 45c of the pivot bracket 45 and effectively change the position of this finger 45c relative to the bottom of the vessel 24. Preferably the adjusting screw 60 is provided with a screw driver slot 59 (FIGS. 8 and 9).

In order to supply the heating element 27 with electrical energy in a controlled manner there are provided a pair of terminal studs 61 and 62 which are supported in an insulated manner from the flange 46a of the terminal bracket 46, as best shown in FIGS. 10 and 11 of the drawings. The flange 46a is sandwiched between two sheet insulators 64 and 65. Moreover, the flange 46a is provided with enlarged openings designated at 66, one of which is shown in FIG. 11 of the drawings through which the terminal studs 61 and 62 may extend. An insulating washer 67 is disposed in each of these enlarged openings 66 to insulate the studs 61 and 62 from the flange 46. Preferably the terminal studs 61 and 62 have an enlargement such as 61a and 62a which engages the insulator 65. The portion of the studs 61 and 62 projecting beyond the inside of the flange 46a is riveted to hold the sandwiched assembly comprising flange 46a, insulators 64, 65 and 66 and a suitable electrical conductor designated as 69 in the case of terminal studs 61, and 70 in the case of terminal stud 62 in assembled relationship, the studs being riveted over as indicated at 61b and 62b, FIGS. 10 and 11 of the drawings. The conductor 70 is merely a U-shaped conductor which is so shaped to extend around the other elements defining temperature responsive device 40 and make electrical connection with the terminal 29 of the heating element 27. This connection is made by welding or the like so that the conductor 70 which is a rigid conductor is held in assembled position by the welding at one end thereof and the riveting of terminal stud 62 at the other end thereof. The conductor 69, on the other hand, is essentially a switch spring blade formed of stainless steel or the like having a flanged portion 69a resting against the insulator 64 and held there by the riveted portion 61b of the terminal stud 61. Moreover, this flanged portion 69a includes an ear 69b receivable in aligned notches 71 defined in the insulators 64 and 65 thereby holding the spring blade 69 in fixed position relative to the flange 46a. The free end of the spring blade 69 supports an electrical contact 72 whereby the spring blade 69 might be considered a movable switch arm and the contact 72 a movable switch contact as will become apparent from the ensuing description.

For the purpose of providing a cooperating contact so as to provide a complete switch, there is provided a stationary contact 73 mounted on a rigid conductor 74 welded or otherwise suitably secured to the terminal 30 of the heating element 27. The stationary contact 73 is so positioned that the inherent resilience of spring blade 69 tends to bias movable contact 72 into contacting engagement with stationary contact 73. It will be apparent that the terminal studs 61 and 62 are standard male bayonet type terminals for making ready electrical connection with a female type terminal plug well known in the art and shown in dotted lines in FIG. 1 designated by the reference numeral 77. The conventional cord connector 77a is associated with terminal plug 77. Unless means are provided to separated the contacts 72 and 73, they are normally closed due to the inherent resilience of the spring blade 69, and thus when cord connector 77a is connected to a source of electrical energy and to terminal studs 61 and 62, electrical energy is supplied to the heating element 27.

In order to terminate the heating operation means are provided to move relatively movable contact 72 out of contacting engagement with stationary contact 73 when predetermined temperature conditions of the bottom 24a of the vessel 24 are attained. To this end there is provided a switch lever 78 of somewhat Y-shaped configuration having two arms 78a of the Y adapted to make pivotal connection with the arms 45b of the pivot bracket 45. As best shown in the greatly enlarged view of FIG. 7 each of the arms 45b is provided with a V-shaped notch at the end thereof designated by the reference numeral 79. The ends of the arm 78a of the Y-shaped switch lever 78 are cut away at the edges to define notches 80, which notches are defined by an angular surface 81 and a portion 82 of reduced cross section, as clearly indicated in FIG. 7, defining a pivot point at each arm receivable in the notches 79. The inclined surfaces 81 on each arm 78a permit pivoting of lever 78 without interference from the V-shaped notch walls. One of these walls of the notch 79 is stepped, as indicated at 83 in FIG. 6 of the drawings, to provide stops for the switch lever 78a and yet to provide free pivoting thereof.

In order to hold the Y-shaped switch lever 78 in pivotal engagement with the notches 79, there is provided a tension spring 85 having a hook 85a at one end thereof for engaging with a cooperating opening 86 defined in the deflectable finger 45c of pivot bracket 45. The other end of tension spring 85 is provided with a hook 85b receivable in an opening 88 defined in the switch lever 78. With this arrangement the switch lever 78 is effectively an over center device which has two stable positions. In FIGS. 8 and 9 of the drawings the effective point of engagement between the spring 85 and the finger 45c is represented by the letter X while the corresponding point of engagement between the spring 85 and the switch lever 78 is designated by the letter Y. These points are interconnected in FIGS. 8 and 9 by dashed lines and when the pivot points 82 are below these lines, as indicated in FIG. 8 of the drawings, the switch lever 78 will move to the extreme upper position indicated in FIG. 8 of the drawings with the tension spring 85 holding it in this position. This is the closed switch position. When, on the other hand, the pivot points 82 move above the line X—Y, as shown by the dotted line position of the switch lever 78 in FIG. 9 of the drawings, the switch lever is held in this dotted line position which is the other stable position and the open switch position. In solid lines in FIG. 9 of the drawings is indicated the position of these parts at the instant before snap action of lever 78 from the solid line position of FIG. 8 to the dotted line position of FIG. 9 occurs, and at that instant the pivot points 82 are essentially coincident with the line X—Y.

So that the snap acting movement of the switch lever 78 actuates the switch comprising relatively movable contacts 72 and 73 in response to deflection of the bimetallic element 41, the switch lever 78 is provided with an ear 78b engageable by bimetallic element 41. The switch lever 78 is also provided with an insulating switch actuating member 89 which is suitably secured to an ear 78c of the lever 78 as by a rivet 90. This insulating switch actuating member 89 is adapted when switch lever 78 moves to the dotted line position shown in FIG. 9 to engage spring blade 69 and cause opening of the switch comprising contacts 72 and 73 as indicated in FIG. 9 of the drawings.

The purpose of adjusting screw 60 is now apparent particularly with reference to FIGS. 8 and 9 of the drawings. When this screw is adjusted to move spring supporting finger 45c of pivot bracket 45 toward the bottom of the vessel 24, as viewed in the figures, it is apparent that the point X will be raised as viewed in FIGS. 8, and 9, and greater deflection of the bimetallic element 41 is necessary. With this arrangement the heating device may readily be calibrated so that cooking is terminated at the desired time.

It should be appreciated that the temperature responsive device 40 should be provided with means for manually closing the switch comprising contacts 72 and 73 when the heating operation has been terminated and the switch lever is moved by snap action to the dotted line position shown in FIG. 9 of the drawings. To this end the switch lever 78 is provided with the arm 78d to which may be secured a suitable manual actuating knob 92. From the above description it will be appreciated that the thermal responsive device 40 is a very simple device and is assembled to the vessel 24 by the use of a single stud 36 and the welding of the conductors to the terminals 29 and 30. All other parts are interrelated in a simple manner without the requirement of any fastening means and, yet, the entire mechanism is assembled in a foolproof manner and properly orientated with respect to the vessel 24.

For the purpose of housing the temperature responsive device 40 and at the same time providing an insulated support for the vessel 24 so that the heating device may be supported from any surface without damage thereto, there is provided an insulating base generally designated at 94 which with the vessel 24 and the temperature responsive device 40, described hereinafter, defines the vessel and base assembly generally designated at 22. As illustrated, the base 94 is preferably molded from an insulating phenolic material and is provided with a pair of diametrically opposed projecting ears 94a which define handles for supporting and carrying the cooking device 20. Essentially the base 94 comprises a cup-shaped cylindrical portion 94b defining a chamber 95 therein from the top edges of which the handles 94a project. The annular top edge of this cup-shaped portion 94b designated as 96 abuts against the bottom 24a of the vessel 24. The dashed circle Z, FIG. 4, designates the inner surface of the top of the insulating base 94.

To secure the base 94 to the vessel 24, the cup-shaped portion 94b is provided at the center bottom thereof with an opening 98 through which the stud 36 may project. The bottom of the base 94 is furthermore provided with a recess 99 concentric with the opening 98 to receive a nut 100 engageable with a threaded portion 101 defined on the stud 36 and spaced from the threaded portion 54.

So that adjustment of the adjusting screw 60 may readily be made when the base 94 is assembled to vessel 24, the bottom of the insulating support 94 is further provided with an opening 102 aligned with the screw 60. A suitable tool such as a screw driver may be inserted through the opening 102 and engage a screw driver slot 59 defined in the adjusting screw 60. Preferably the bottom of the insulating base 94 further includes a plurality of spaced legs 94c.

In order to accommodate the terminal studs 61 and 62 and afford ready access thereto when the base 94 is assembled to the vessel 24, the former is provided with an oval shaped opening 105 beneath one of the handles 94a, which opening is of such a size as to readily receive the conventional female plug 77 connected to suitable power cord 77a in a manner well understood by those skilled in the art. Furthermore, to accommodate the switch lever 78 the base 94 is provided with a slotted opening 106 through which the arm 78d of switch lever 78 may project. Preferably a suitable projecting flange 94d integrally molded with the base 94 surrounds the slotted opening and encloses the manually actuatable switch button 92 so that it may readily be actuated by the user but may not be inadvertently actuated by accidentally brushing against the same. Suitable indicia such as "On" and "Off" to indicate the closed and open condition of the switch comprising contacts 72 and 73 is preferably provided on the frame 94d as clearly shown in FIGS. 1 and 14 of the drawings.

For the purpose of insuring that the single nut 100 will securely hold the base 94 to the vessel 24, the annular surface or top ridge 96 engageable with the bottom 24a of the vessel 24 is provided with a pair of diametrically opposed notches or recesses 108, FIGS. 4 and 5, for receiving the ends of the lugs 24f and 24g. Additionally, the outer ends of the four lugs 24e engage the inner periphery of the base portion 94b, as is clearly shown by the dashed line Z in FIG. 4 of the drawings, engaging the ends of these lugs. With this arrangement the single nut 100 firmly secures the base 94 into position on vessel 24.

As was mentioned above, the vessel and base unit 22 may be used alternatively as the heating device for an egg cooker or as the heating device for a baby bottle warmer. When the device is used as an egg cooker there preferably is employed an egg rack 110, best shown in FIG. 13 of the drawings, and the cover 21, best shown in FIG. 12 of the drawings. The egg rack is preferably a disk of sheet metal having a depending outer flange 110a adapted to rest on the bottom 24a of the vessel 24. The disk 110 is provided with a plurality of spaced openings 113, seven being shown in FIG. 13 of the drawings to receive and support eggs in a manner clearly indicated in FIG. 2 of the drawings. It will be appreciated that in boiling eggs it is preferably desirable to pierce the shell at the point where the air space in the egg normally occurs so that any pressure developed during the cooking operation will be permitted to escape through this opening. Such a piercing device indicated in the form of a needle 114 is preferably supported in a depending recess 115 defined in the egg rack 110 and best shown in FIGS. 2, 3 and 13 of the drawings. As illustrated the piercing needle 114 is suitably supported in a needle mount 116 which in turn is supported as indicated in FIG. 3 at the bottom of the recess 115. When all the eggs have been pierced and supported in the egg rack openings 113 as indicated in FIG. 2 of the drawings, an additional egg may then be disposed above the recess 115 as clearly indicated in FIGS. 2 and 3 of the drawings. Thus eight eggs or any lesser number may be simultaneously cooked with a device built in accordance with the present invention.

In accordance with the present invention the cover 21 for the heating device 20 when used as an egg cooker is preferably also molded from a suitable moldable material such as a melamine resin or the like. Preferably, cover 21 is in the form of an inverted dish with a peripheral recess 120 defined around the vessel engaging edge to receive the open top of the vessel 24 as clearly shown in FIG. 2 of the drawings. Preferably the cover includes a pair of elongated openings or steam escape passageways 121 for the escape of steam during the cooking operation.

In order that the cover 21 may readily be grasped by the hand of the operator, it is provided with a handle portion of reduced cross section designated at 21a. To facilitate grasping of the handle 21a it is illustrated as being provided with a knurled surface 123, and if desired, with a circumferential groove 124 beneath this knurled surface to permit the tips of the operator's fingers to grasp the same. In a device built in accordance with the present invention the top of the hand grip portion 21a was provided with a recess 125 to receive therein a suitable nameplate 126 having any desired indicia thereon.

In accordance with the present invention the handle portion 21a is hollow as indicated in FIGS. 2 and 12 of the drawings to define a measuring chamber 128 therein for measuring varied quantities of water to be placed in the vessel 24 to determine the length of the heating or cooking operation. In order to determine specific quantities of liquid to be measured in the chamber 128, there are integrally molded with the cover 21 a plurality of radial fins of different vertical extent specifically designated as 21b, 21c, 21d and 21e; these fins or vanes varying in height with 21b being the fin of the maximum vertical extent, 21c the next, 21d the next and 21e the fin of the minimum vertical extent. This is clearly evident from FIGS. 2 and 12 of the drawings. Preferably corresponding indicia may be molded on the depending ends of the fins or vanes 21b, 21c, 21d and 21e. As indicated in the drawings, vane 21b has the indica Medium molded thereon, vane 21c has the indicia Poach molded thereon, vane 21d has the indica Soft molded thereon and vane 21e has the indica Very Soft molded thereon. When water to the height of any one of these vanes is placed in the measuring chamber 128 and then this liquid is inserted in the vessel 24 which in turn has its heating element 27 connected to a source of electrical power, the condition of the cooked eggs which will result when the device automatically terminates the cooking operation will be that indicated by the indicia on the vane which determined the height of the liquid. As was mentioned earlier, for hard boiled eggs the cooking vessel itself has the shoulder 26 therein. In the event it is desired to poach eggs preferably a poaching tray, which may be similar to that disclosed in the aforesaid Jepson Patent 2,761,375, may be used. When such a poaching tray is used, which is preferably a compartmented tray, it will be placed upon the egg rack 110 and supported directly thereon.

The egg cooker 20 described above may readily be converted to a baby bottle warmer by removing the egg rack 110 and the cover 21 and instead inserting a bottle support 130 best shown in FIGS. 14 and 15 in the vessel 24. Also the cover 23 shown in FIG. 14 is utilized instead of the cover 21. The bottle support 130 preferably comprises two U-shaped metal strips 130a and 130b which have the legs thereof slightly diverging and the bights thereof welded or otherwise secured together as clearly indicated in FIG. 15 of the drawings. The upper edges of the support are notched as indicated at 132, the notching being of sufficient extent to receive a baby's bottle such as is disclosed by the reference numeral 133 in FIG. 13 of the drawings. The cover 23 may be very similar to the cover in Jepson Patent 2,778,921 except that it includes a flared bottom 23a of such a diameter as to fit the vessel 24 in exactly the same manner as does the cover 21. As in Jepson Patent 2,778,921 there are provided steam escape passageways or slots 134 adjacent the bottom of the cover 23 and steam escape passageways or slots 135 adjacent the top thereof. In a device built in accordance with the present invention two slots 135 were provided near the top of the cover disposed in diametrically opposed-relationship while six slots 134 were provided in uniformly spaced relationship around the bottom of the flared portion 23a. Preferably the cover 23 includes a combined handle and measuring device 136 which may be identical with that disclosed and claimed in Jepson Patent 2,778,921 and no further description thereof is included herewith. The cover 23 is preferably molded from a suitable plastic such as a melamine resin or the like and is of sufficient height so that a baby bottle plus the nipple may be disposed therein, as clearly shown in FIG. 14 of the drawings, and so that during the heating operation a jacket of steam envelopes the bottle and nipple for uniformly heating the contents thereof.

In view of the detailed description included above, the operation of the egg cooker and the baby bottle warmer, principal portions of which are identical, will readily be understood. An improved temperature responsive device has been provided which is simple and inexpensive and foolproof in operation.

While there has been illustrated and described several embodiments of the present invention, it will be understood that numerous changes and modifications will occur to those skilled in the art and it is aimed in the appended claims to cover all such changes and modifications as fall within the true spirit and scope of the present invention.

What is claimed as new and desired to be secured by Letters Patent of the United States is:

1. An electric heating device comprising an open top vessel, an electric heating element in good heat exchange relationship with the bottom of said vessel, rigid terminals electrically connected to the ends of said heating element and depending from the bottom of said vessel but electrically insulated therefrom, a stud depending from the bottom of said vessel and having one end secured to the bottom of said vessel, temperature responsive means for controlling the flow of current to said heating element secured to the bottom of said vessel solely by said stud, said temperature responsive means comprising a bimetallic element having one end thereof in good heat exchange relationship with the bottom of said vessel, said temperature responsive means in addition to said bimetallic element including a terminal bracket and a pivot bracket, said stud securing said brackets and said bimetallic element to the bottom of said vessel in stacked relationship, cooperating means on said brackets for orientating them in fixed relationship to each other relative to movement about the longitudinal axis of said stud, means on one of said brackets cooperating with the bottom of said vessel for preventing relative rotation of said one bracket about said longitudinal axis of said stud thereby fixedly securing said brackets and said bimetallic elements to said vessel, an electrical circuit means including relatively movable contacts connected to said rigid terminals, at least part of said circuit means being supported by one of said brackets, means pivotally related to said pivot bracket and movable with a snap action relative thereto for causing opening of said contacts when in one predetermined position, and means on said last-mentioned means engageable by said bimetallic element for opening said contacts in response to deflection of said bimetallic element.

2. In an electric heating device, an open top vessel, an electric heating element in good heat exchange relationship with the bottom of said vessel, rigid terminals electrically connected to the ends of said heating element and depending from the bottom of said vessel but electrically insulated therefrom, a stud depending from the bottom of said vessel and having one end secured to the bottom of said vessel, temperature responsive means for controlling the flow of current to said heating element secured to the bottom of said vessel solely by said stud, said temperature responsive means comprising a bimetallic element, a terminal bracket and a pivot bracket, said stud securing said brackets and said bimetallic element to the bottom of said vessel in stacked relationship, cooperating means on said brackets for orientating them in fixed relationship to each other relative to movement about the longitudinal axis of said stud, means on one of said brackets cooperating with the bottom of said vessel for preventing relative rotation of said one bracket about said longitudinal axis of said stud thereby fixedly securing said brackets and said bimetallic-element to said vessel, an electrical circuit means including relatively movable contacts connected to said rigid terminals, at least part of said circuit means being supported by one of said brackets, means pivotally related to said pivot bracket and movable with a snap action relative thereto for causing opening of said contacts when in one predetermined position, and means on said last-mentioned means engageable by said bimetallic element for opening said contacts in response to deflection of said bimetallic element.

3. The heating device of claim 2 wherein said pivot bracket includes a pair of spaced arms with notches in the ends thereof and said means pivotally related to said pivot bracket comprises a switch lever having portions receivable in said notches, and tension spring means connected between said pivot bracket and said switch lever comprising the sole means for holding said pivot bracket and switch lever in operative relationship.

4. The heating device of claim 3 wherein said pivot bracket includes a deflectable finger disposed between said spaced arms to which said tension spring means is connected.

5. The heating device of claim 4 wherein said temperature responsive means includes means for selectively adjusting the position of said finger thereby to control the effective temperature at which said relatively movable contacts are actuated.

6. An electric heating device comprising an open top vessel, an electric heating element in good heat exchange relationship with the bottom of said vessel, rigid terminals electrically connected to the ends of said heating element but electrically insulated therefrom, a stud depending from the bottom of said vessel and having one end secured to the bottom of said vessel, temperature responsive means for controlling the flow of current to said heating element secured to the bottom of said vessel solely by said stud, said temperature responsive means comprising a bimetallic element having one end thereof in good heat exchange relationship with the bottom of said vessel, said temperature responsive means in addition to said bimetallic element including a terminal bracket, a pivot bracket and an adjusting screw bracket, said stud securing said brackets and said bimetallic element to the bottom of said vessel in stacked relationship, cooperating means on said brackets for orientating them in fixed relationship to each other relative to movement about the longitudinal axis of said stud, means on said terminal bracket cooperating with the bottom of said vessel for preventing relative rotation of said one bracket about said longitudinal axis of said stud thereby fixedly securing said brackets and said bimetallic element to said vessel, an electrical circuit means including relatively movable contacts connected to said rigid terminals, at least part of said circuit means being supported by said terminal bracket, means pivotally related to said pivot bracket and movable with a snap action relative thereto for causing opening of said contacts when in one predetermined position, means on said last-mentioned means engageable by said bimetallic element for opening said contacts in response to deflection of said bimetallic elements, and manual means for closing said contacts.

7. The heating device of claim 6 wherein the bottom of said vessel includes integral means defining projections and notches cooperating with corresponding means on said terminal bracket.

8. In an electric heating device a cast metal open top vessel having an integral C-shaped rib depending from the bottom thereof, a C-shaped electric heating element embedded in said rib, rigid terminals electrically connected to the ends of said heating element and depending from the bottom of said vessel adjacent the ends of said rib but electrically insulated therefrom, a stud having one end cast into the bottom of said vessel with the remainder thereof depending from the bottom of said vessel, temperature responsive means for controlling the flow of current to said heating element secured to the bottom of said vessel solely by said stud, said temperature responsive means comprising a bimetallic element having one end thereof in good heat exchange relationship with the bottom of said vessel and including an opening in said one end to receive said stud, said temperature responsive means in addition to said bimetallic element including a terminal bracket, a pivot bracket and an adjusting screw bracket each of which has an opening for receiving said stud and all clamped in stacked relationship with each other and said bimetallic element to the bottom of said vessel with said openings aligned with the longitudinal axis of said stud, cooperating means on said stacked brackets for orientating them in fixed relationship to each other relative to movement about said longitudinal axis of said stud, means on one of said brackets cooperating with the bottom of said vessel for preventing relative rotation of said one bracket about said longitudinal axis of said stud thereby fixedly securing all of said brackets and said bimetallic element to said vessel, an electrical circuit means including relatively movable contacts connected to said rigid terminals, means pivotally related to said pivot bracket and movable relative thereto including means for actuating said contacts, and an insulating base for said vessel secured thereto by means cooperating with said stud.

9. The heating device of claim 8 wherein the bottom of said vessel includes integral projections cooperating with said base whereby said last-mentioned means and said stud fixedly relate said vessel and said base.

10. The heating device of claim 8 wherein said means pivotally related to one of said brackets includes a tension spring connected to a finger integral with said pivot bracket and said adjusting screw bracket includes an adjustable screw engageable with said finger.

References Cited in the file of this patent

UNITED STATES PATENTS

| 180,469 | Eberle | Aug. 1, 1876 |
| 857,350 | Kamenstein | June 18, 1907 |
| 1,250,888 | Johnson | Dec. 18, 1917 |
| 2,466,875 | Brandt | Apr. 12, 1949 |
| 2,629,511 | Gosnell | Feb. 24, 1953 |
| 2,761,375 | Jepson | Sept. 4, 1956 |
| 2,778,921 | Jepson | Jan. 22, 1957 |
| 2,807,701 | Conlin et al. | Sept. 24, 1957 |
| 2,844,258 | Faber | July 22, 1958 |
| 2,931,884 | Jepson et al. | Apr. 5, 1960 |